United States Patent
Chism, II

(10) Patent No.: US 12,281,992 B1
(45) Date of Patent: Apr. 22, 2025

(54) SYSTEMS AND METHODS FOR VOLTAGE CONTRAST IMAGING USING PHOTOREFLECTANCE MICROSCOPY

(71) Applicant: William W. Chism, II, Austin, TX (US)

(72) Inventor: William W. Chism, II, Austin, TX (US)

( * ) Notice: Subject to any disclaimer, the term of this patent is extended or adjusted under 35 U.S.C. 154(b) by 0 days.

(21) Appl. No.: 17/877,928

(22) Filed: Jul. 30, 2022

Related U.S. Application Data

(60) Provisional application No. 63/360,159, filed on Sep. 13, 2021.

(51) Int. Cl.
*G01N 21/55* (2014.01)
*G01N 21/95* (2006.01)

(52) U.S. Cl.
CPC ......... *G01N 21/9505* (2013.01); *G01N 21/55* (2013.01); *G01N 2201/06113* (2013.01)

(58) Field of Classification Search
CPC ............... G01N 21/9505; G01N 21/55; G01N 2201/06113
See application file for complete search history.

(56) References Cited

U.S. PATENT DOCUMENTS

| | | |
|---|---|---|
| 7,060,957 B2 | 6/2006 | Lange et al. |
| 7,550,705 B2 | 6/2009 | Seitz et al. |
| 7,595,476 B2 | 9/2009 | Beer et al. |
| 9,131,170 B2 | 9/2015 | Mandelis et al. |
| 10,073,045 B2 * | 9/2018 | Barak ................. G02B 21/0016 |
| 10,365,231 B2 * | 7/2019 | Barak ................. G03F 7/70625 |
| 10,921,369 B2 | 2/2021 | Chism |
| 2006/0215175 A1 | 9/2006 | Yacoubian |
| 2007/0252988 A1 | 11/2007 | Levy |
| 2008/0218741 A1 * | 9/2008 | Murtagh ............ G01N 21/9501 356/73 |
| 2010/0051786 A1 | 3/2010 | Lotto et al. |
| 2016/0103307 A1 * | 4/2016 | Frankel .............. G02B 21/0032 600/317 |
| 2016/0131594 A1 * | 5/2016 | Koldiaev ........... G01N 21/9501 702/172 |

(Continued)

OTHER PUBLICATIONS

Roger A. Light, Richard J. Smith, Nicholas S. Johnston, Michael G. Somekh, and Mark C. Pitter "CMOS lock-in optical sensor for parallel detection in pump-probe systems", Proc. SPIE 8073, Optical Sensors 2011; and Photonic Crystal Fibers V, 807304 (May 6, 2011); https://doi.org/10.1117/12.886892 (Year: 2011).*

(Continued)

*Primary Examiner* — Tarifur R Chowdhury
*Assistant Examiner* — Kemaya Nguyen
(74) *Attorney, Agent, or Firm* — The Langley Law Firm, P.C.

(57) ABSTRACT

An optical technique for voltage contrast imaging of the active electronic properties of semiconductors, including semiconductor surfaces, periodic structures, and electrically active defects, is disclosed. A pump laser beam is used to produce a modulated photovoltage in a semiconductor sample and a second probe laser beam is used to detect synchronous changes in the reflectance of the sample, resulting in a non-contact voltage contrast imaging capability. Exemplary optical configurations enabling high-throughput voltage contrast inspection of electrically active defects are discussed.

14 Claims, 3 Drawing Sheets

(56) References Cited

U.S. PATENT DOCUMENTS

2018/0329272 A1* 11/2018 Muir ................ G02F 1/3517
2020/0300767 A9   9/2020 Kiss et al.
2020/0322561 A1  10/2020 Verdant
2023/0035404 A1*  2/2023 Oren ................ H01L 22/12

OTHER PUBLICATIONS

N. Bottka et al., "Modulation Spectroscopy as a Tool for Electronic Material Characterization," J. Elec. Mater. 17, 161-170 (1988).

J.A. Lock et al., "Failure of the optical theorem for Gaussian-beam scattering by a spherical particle," J. Opt. Soc. Am. A 12, 2708-2715 (1995).

R.E. Samad and N.D. Vieira, "Analytical description of z-scan on-axis intensity based on Huygens-Fresnel principle," J. Opt. Soc. Am. B 15, 2742-2747 (1998).

J. Misiewicz et al., "Photoreflectance spectroscopy applied to semiconductors and semiconductor heterostructures," Optica Applicata 29, 327-363 (1999).

U. Behn et al., "Optimization of the signal-to-noise ratio for photoreflectance spectroscopy," J. Appl. Phys. 90, 5081-5085 (2001).

N. George, "Fourier Optics," The Institute of Optics, University of Rochester, Dec. 2012, 43 pages.

J.A. Kurvits et al., "Comparative analysis of imaging configurations and objectives for Fourier microscopy," J. Opt. Soc. Am. A 32, 2082-2091 (2015).

Q. Sun et al., "Camera-based high frequency heterodyne lock-in carrierographic (frequency-domain photoluminescence) imaging of crystalline silicon wafers," Phys. Status Solidi A 213, 405-411 (2016).

Y. Liu et al., "Bit-efficient, sub-millisecond wavefront measurement using a lock-in camera for time-reversal based optical focusing inside scattering media," Optics Lett. 41, 1321-1324 (2016).

S. Bosch and J. Sancho-Parramon, "Procedures for the measurement of the extinction cross section of one particle using a Gaussian beam," J. Quant. Spectrosc. Radiat. Transfer 180, 77-83 (2016).

Y. Liu et al., "Lock-in camera based heterodyne holography for ultrasound-modulated optical tomography inside dynamic scattering media," Appl. Phys. Lett. 108, 231106 (2016).

A.M. Wojciechowski et al., "Camera-limits for wide-field magnetic resonance imaging of a nitrogen-vacancy spin sensor," arXiv preprint arXiv:1708.06317v1 (2017).

M.P. Halsall et al., "Photomodulated Reflectivity Measurement of Free-Carrier Dynamics in InGaN/GaN Quantum Wells," ACS Photonics 5, 4437-4446 (2018).

R. Kudrawiec and W. Walukiewicz, "Electromodulation spectroscopy of highly mismatched alloys," J. Appl. Phys. 126, 141102 (2019).

S. Adhikari et al., "Photothermal Microscopy: Imaging the Optical Absorption of Single Nanoparticles and Single Molecules," ACS Nano 14, 16414-16445 (2020).

R.A. Light et al., "CMOS lock-in optical sensor for parallel detection in pump-probe systems," Proc. SPIE 8073, Optical Sensors 2011; and Photonic Crystal Fibers V, 807304 (May 6, 2011).

A.R. Davis et al., "Spatially Mapping Charge Carrier Density and Defects in Organic Electronics Using Modulation-Amplified Reflectance Spectroscopy," Adv. Mater. 26, 4539-4545 (2014).

* cited by examiner

SYSTEMS AND METHODS FOR VOLTAGE CONTRAST IMAGING USING PHOTOREFLECTANCE MICROSCOPY

CROSS-REFERENCE TO RELATED PATENT APPLICATIONS

This application claims benefit of priority of U.S. Provisional Application Ser. No. 63/360,159, filed on Sep. 13, 2021, and which is incorporated herein by reference in its entirety.

BACKGROUND

Field of the Invention

The present invention relates to optical imaging and, more particularly, to voltage contrast imaging of semiconductors using photoreflectance microscopy.

Background of the Invention

Defect inspection is a major challenge in modern semiconductor device manufacturing. Semiconductor device manufacturers dedicate immense resources to find, categorize, and ultimately eliminate electronic defects. For example, a current state of the art defect inspection approach involves acquiring vast sets of optical data (i.e., optical images of defects), which data is categorized or labeled according to impact on device performance and/or manufacturing yield, and which labeled data sets are then used to train artificial intelligence-based systems to predict and control advanced manufacturing processes. However, when the optical data does not contain adequate information (e.g., the electrical characteristics of a defect), such machine learning based approaches necessary fail. This relatively common situation has driven (and continues to drive) the increased adoption of much lower throughput "e-beam" inspection techniques (including the attendant increased resource commitment). In short, the present state of defect inspection is characterized by a wide gap between low-capability optical inspection techniques and low-throughput e-beam inspection techniques. Thus, in view of this capability-throughput gap in critical defect inspection techniques, there is a need for optical inspection techniques with direct sensitivity to the electronic properties of defects.

The systems and methods disclosed herein generally utilize photo-modulated reflectance ("photoreflectance") techniques to image the electronic properties of defects. Photoreflectance has historically been used to determine electronic band structures, internal electric fields, and other semiconductor properties such as crystallinity, composition, physical strain, and doping concentration [J. Misiewicz et al., "Photoreflectance spectroscopy applied to semiconductors and semiconductor heterostructures," Optica Applicata 29, 327-363 (1999).]. The conventional photoreflectance setup utilizes an intensity modulated pump laser beam to modulate the free charge density in a semiconductor sample (i.e., via photo-injection), thereby modulating the sample's internal electric field [R. Kudrawiec and W. Walukiewicz, "Electromodulation spectroscopy of highly mismatched alloys," J. Appl. Phys. 126, 141102 (2019). ("Kudrawiec 2019")]. The photo-modulated electric field produces changes in the reflectance of the sample at wavelengths near the interband transitions of semiconductor material within the sample. A second probe light beam is then used to measure the reflectance of the sample. The pump light is typically modulated at a known frequency so that a lock-in amplifier may be used to suppress unwanted noise, resulting in the ability to detect modulated reflectance changes at the ppm level.

It may be appreciated the photo-modulated electric field corresponds to a photo-modulated voltage. Indeed, the conventional photoreflectance is given by:

$$\Delta R/R = 2qN_e \times L(\lambda)/\varepsilon_s \times \Delta V, \quad (1)$$

where $q$ is the electronic charge, $N_e$ is the active dopant concentration, $L(\lambda)$ is a third-derivative functional form determined by the semiconductor bandstructure ($\lambda$ is the probe beam wavelength), $\varepsilon_s$ is the static dielectric constant, and $\Delta V$ is the pump-induced photo-voltage [N. Bottka et al., "Modulation Spectroscopy as a Tool for Electronic Material Characterization," J. Electron. Mater. 17, 161-170 (1988).]. Thus the conventional photoreflectance signal is linearly proportional to the pump-induced voltage contrast.

Despite its direct sensitivity to photo-voltage, for several reasons photoreflectance has not been adapted to perform voltage contrast imaging. First, the relatively strong DC background light levels inherent to photoreflectance may saturate low light level imagers such as CCDs. Moreover, when multiple small signals are to be measured simultaneously, such as, for example, the parallel acquisition of photoreflectance signals projected onto a photosensor array, then in general the same number of lock-in amplifiers (or other phase-locked detection circuits) are required. Multi-channel lock-in amplifiers are commercially available, but for the number of channels required for imaging this approach quickly becomes unwieldy and/or expensive.

SUMMARY OF THE INVENTION

The present invention relates to methods for optical imaging of semiconductor samples. More particularly, the present invention provides systems and methods for non-contact voltage contrast imaging of semiconductor surfaces, periodic structures, and electrically active defects using photoreflectance microscopy.

The exemplary embodiments discussed herein utilize Gaussian laser beams for both the pump and probe beams in a photoreflectance microscope. The pump beam is an intensity modulated laser beam used to modulate the charge density in a semiconductor sample. A second continuous wave probe laser beam is used to probe the change in reflectance of the sample as the intensity modulated pump radiation interacts with the sample. The modulated component of the reflected probe beam is also a Gaussian beam with its propagation determined by the propagation of the pump and probe beams. Photoreflectance signals are acquired using a lock-in camera comprising an integrated phase-locked circuit for each photosensor element ("pixel"). In certain embodiments, the modulated component of the reflected probe beam plane is imaged at the back focal plane. Exemplary spatial profiles of the photoreflectance signal at the back focal plane are discussed, including the signatures of scattering from electronic defects at the sample surface. Furthermore, methods to enhance the detection of such defect signals are disclosed. Thus voltage contrast inspection of semiconductors and electrically active defects is attained.

The systems and methods for photoreflectance microscopy disclosed here further enable direct photoreflectance imaging of photo-generated carrier densities via the Drude effect. The Drude carrier reflectance component of the photoreflectance signal is:

$$\Delta R/R = -q^2\lambda^2/2\pi^2\varepsilon_s n(n^2-1)mc^2 \times \Delta N, \quad (2)$$

where n is index of refraction, m is the carrier effective mass, and ΔN is the pump-induced excess carrier density. The Drude component is proportional to the square of the probe wavelength, and thus direct measurement of carrier modulation is preferred at longer wavelengths. However, the Drude component is linearly proportional to the pump-induced excess carrier density. Thus the inventive techniques disclosed herein further enable direct imaging of the excess carrier density using photoreflectance microscopy.

There has thus been outlined, rather broadly, certain features of certain embodiments in order that the detailed description thereof may be better understood, and in order that the present contribution to the art may be better appreciated. There are additional features in embodiments that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION

The following discusses certain embodiments of systems and methods for non-contact voltage contrast imaging of semiconductors and semiconductor electronic defects using photoreflectance microscopy. It is to be understood that the present embodiments provide numerous applicable inventive concepts that may be embodied in a variety of specific contexts. Thus the specific embodiments discussed herein are merely illustrative of specific ways to make and/or use the invention and are not intended to limit the scope of the claims.

Figure 1:
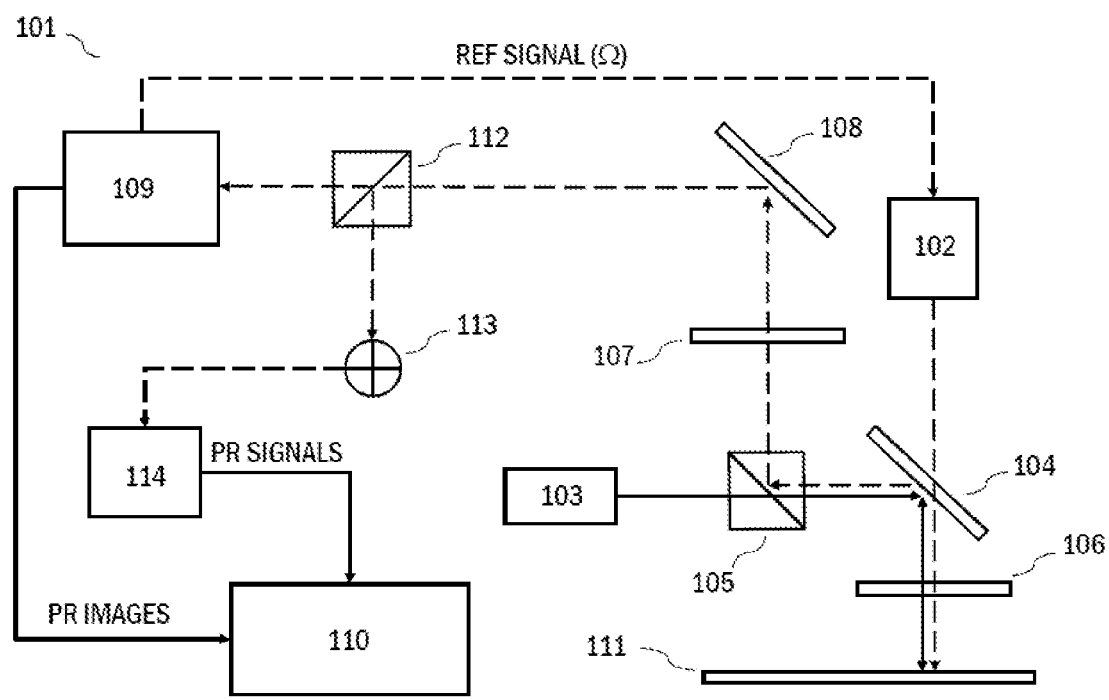
FIG. 1 illustrates an exemplary schematic arrangement of a photoreflectance microscope which may be used to provide voltage contrast inspection of semiconductors and electrically active defects, in accordance with certain embodiments of the present invention.

FIG. 1 contains an exemplary schematic arrangement of a photoreflectance microscope 101 which may be used to provide voltage contrast inspection of semiconductors and electrically active defects. As shown in FIG. 1, said photoreflectance microscope 101 comprises a pump laser source 102, a probe laser source 103, a dichroic mirror 104, a polarizing beamsplitter 105, a quarter wave plate 106, a color filter 107, a dielectric mirror 108, a lock-in camera 109, and a computer 110. The pump laser source 102 is a semiconductor laser diode with photon energy at or above the band gap of semiconductor material within a sample 111. In an exemplary embodiment, the pump laser intensity is directly modulated using a reference signal from the lock-in camera 109. The pump laser source 102 may also be modulated via a signal from an external signal generator (not shown) with a suitable reference signal supplied to the lock-in camera 109. The probe laser source 103 is a continuous wave semiconductor laser diode with photon energy suitable for detecting changes in the reflectance of the sample 111. As may be appreciated, excessive probe beam intensities are undesirable since photo-injection of electron-hole pairs from the probe will reduce the achievable voltage contrast (see e.g., U. Behn et al. "Optimization of the signal-to-noise ratio for photoreflectance spectroscopy," J. Appl. Phys. 90, 5081-5085 (2001)). (Likewise, any DC component of the pump is undesirable.) The pump and probe beam intensities may be controlled via neutral density filters (not shown) fixtured in the input arms of either beam. The intensity modulated pump and continuous wave probe beams (from the pump laser 102 and probe laser 103, respectively) are made collinear using the dichroic beamsplitter 104 and directed to the semiconductor sample 111. The sample 111 reflects the incident probe beam back along the incident coming beam path. Once the probe light is reflected from the sample 111 surface, it has a small amplitude modulation arising from the pump-induced modulation of sample reflectivity. The polarizing beamsplitter 105, operating in conjunction with the quarter wave plate 106, is used to switch the reflected probe beam out of the incident probe beam path. Scattered light from the pump beam and/or any attendant photo-luminescence signal is spectrally filtered using the color filter 107 and/or the dielectric mirror 108. The reflected probe beam is collected and transmitted to the lock-in camera 109. Each pixel of the lock-in camera 109 produces an electrical signal corresponding to the reflected probe light intensity. The lock-in camera 109 further comprises a demodulation circuit for each pixel. Each demodulation circuit outputs a signal corresponding to the mixed and low-pass filtered photoreflectance signal (i.e., phase and/or amplitude) at the pixel. Thus phase sensitive imaging of the reflected probe beam is attained. Secondary stages of the demodulation process may be performed off-pixel as necessary. The demodulated signals are transmitted to the computer 110, which records the photoreflectance images.

In an exemplary embodiment, the invention comprises the use of a CMOS-based lock-in camera as the phase sensitive imager in a photoreflectance microscope. CMOS lock-in cameras perform on-pixel lock-in detection by transferring the charge accumulated on a pixel sequentially between four wells (capacitors), with the cycle period matching the applied modulation frequency. In particular, the voltage measured across the first and third well represents an "in-phase" signal, whereas the voltage measured across the second and fourth well represents a "quadrature" signal. Low-pass filtering is performed by accumulating the charges over many modulation periods before reading out the pixel value. In one embodiment the lock-in camera comprises the "heliCam™ C3.1.1-CP-ML1" available from Heliotis AG. The lock-in feature of this camera provides a sensitivity improvement of up to two orders of magnitude over the equivalent non-lock-in full well capacity, resulting in sensitivities ~$10^{-5}$ (i.e., enabling pixel-level detection of photoreflectance signals ~$10^{-5}$ or greater). Other embodiments include any compact array of photosensor elements functional for detecting the reflected probe light beam and further comprising an integrated demodulation circuit for each photosensor element such as described in U.S. Pat. No. 7,595,476 issued Sep. 29, 2009, to Beer et al. (which is incorporated herein by reference in its entirety).

As also shown in FIG. 1, the reflected probe beam may additionally or alternatively be directed along a second detection path (using a beamsplitter 112 or other suitable means) and transmitted to a position sensitive detector 113 (such as a ring or wedge detector). Such position sensitive detectors are well suited for the detection of characteristic patterns (e.g., defect signatures) in a Fourier plane. Moreover, the use of a position sensitive detector also requires fewer lock-in channels. In this case the position sensitive detector 113 output signals (voltage or current) may be passed to a multichannel lock-in amplifier 114, which measures the output signals (the reference signal may be generated by the lock-in amplifier 114 or an external signal generator, as is known in the art.) The output signals are then transmitted to the computer 110 for recordation and/or further analysis.

Figure 2:
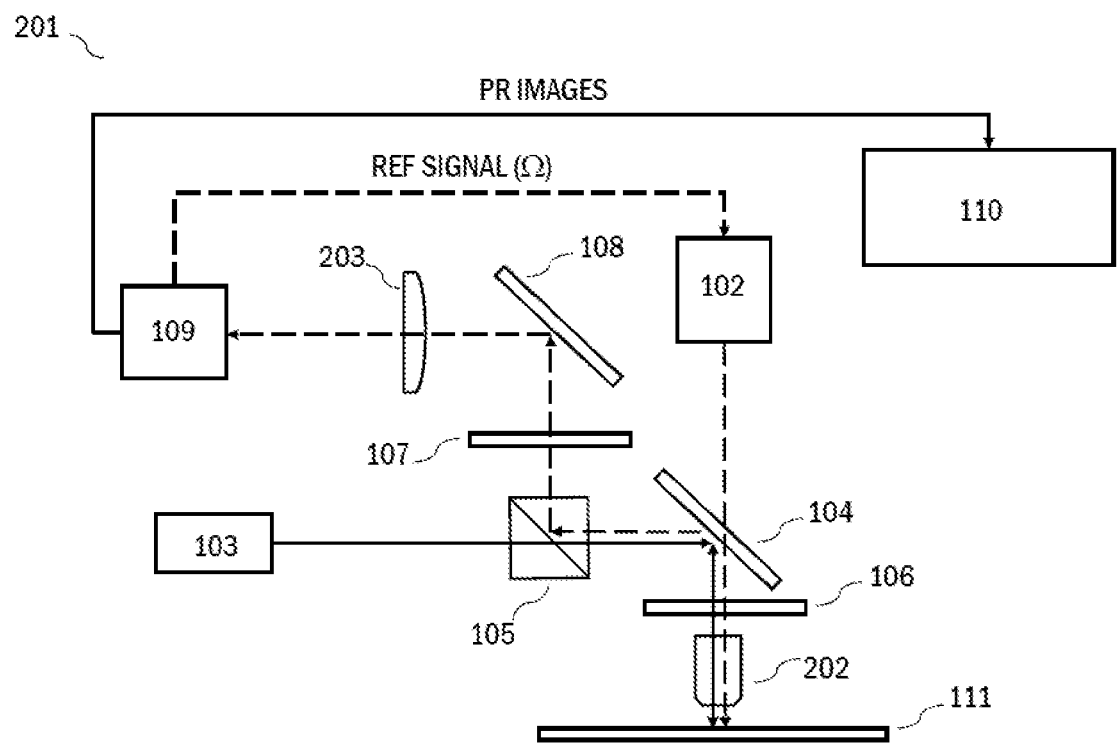
FIG. 2 illustrates an exemplary schematic imaging path 201 of the photoreflectance microscopy apparatus of FIG. 1, in accordance with certain embodiments of the invention.

It is to be appreciated the photoreflectance microscopy apparatus of FIG. 1 is implemented using an optical system. For example, as shown in FIG. 2, an exemplary schematic imaging path 201 of the photoreflectance microscope comprises a microscope objective 202 and a tube lens 203. The microscope objective 202 directs the collinear pump and probe beams to the semiconductor sample 111. The sample 111 reflects the incident probe beam back through the microscope objective 202. The reflected probe beam is collected by the tube lens 203 and input to the lock-in camera 109, thereby forming a real (photoreflectance) image of the object plane (sample surface). Additionally or alternatively, the back focal plane of the microscope objective 202 may be imaged using the tube lens 203 in combination with a Bertrand lens (not shown) to form a "4f relay," as is known in the art (see, e.g., J. A. KURVITS et al., "Comparative analysis of imaging configurations and objectives for Fourier microscopy," J. Opt. Soc. Am. A 32, 2082-2091 (2015)). As discussed hereinafter, the use of such back focal plane imaging in a photoreflectance microscope enables a method for widefield detection of electrically active semiconductor defects.

In an exemplary embodiment, the pump and probe beams are cylindrically symmetric and directed at normal incidence onto the sample. The Fresnel coefficient for the reflected probe beam includes the changes reflectance due to pump-induced energy transformation processes. The mirror-reflected probe beam amplitude may be expanded as a sum of Gaussian beams of decreasing waist. Given a dominant photovoltage effect according to Eq. (1), and retaining only two terms in the expansion, the electric field of the reflected probe laser beam $E_r$ at the surface of the sample may be written:

$$E_r = E_o \times \exp\{-\rho^2/\omega^2\} \times [r + \partial r/\partial n \times (n_2 + ik_2) I_p \times \exp\{-2\rho^2/\omega_m^2\}], \quad (3)$$

where $|E_o|^2$ is the intensity of the probe beam at focus, $\omega$ is the probe beam waist, $\rho$ is the radial distance as measured from the probe beam axis, r is the complex reflectance coefficient, n is the index of refraction of the sample, $n_2$ and $k_2$ are effective nonlinear indices defined by the coefficients appearing in Eq. (1), $I_p$ is the intensity of the pump beam at focus, and $\omega_m$ is the "radius of modulation" (see, e.g., U.S. Pat. No. 10,921,369 issued Feb. 16, 2021, to Chism, which is incorporated herein by reference in its entirety). The leading term corresponds to the DC component of the reflected probe beam whereas the second term corresponds to its modulated component (i.e., the electric field of the reflected probe beam takes the form $E_r = E + \Delta E$). The modulated photoreflectance signal in general corresponds to the interference of these two components and is given by $\Delta R = 2\text{Re}[E \times \Delta E]$. As may be seen from Eq. (3), the modulated component of the reflected probe beam is also a Gaussian beam with effective waist $\omega_e$ defined by the incident probe beam waist and the radius of modulation (i.e., $1/\omega_e^2 \equiv 1/\omega^2 + 2/\omega_m^2$). The photoreflectance signal at a detector plane may then be established by propagating each component to the detector plane and forming the product $2\text{Re}[E \times \Delta E]$.

The propagation of any Gaussian beam through an optical system may be treated using a well-known formalism. For example, at a back focal plane the electric field distribution of a cylindrical Gaussian beam is given by (disregarding the spatial phase):

$$E_{bf} = E_o(\omega/\omega_b) \times \exp\{-\rho^2/\omega_b^2\},$$

where $\omega_b = \lambda f/\pi\omega$ and f is the overall focal length. From this result in view of the discussion above and Eq. (3) we obtain for the photoreflectance signal at a back focal plane:

$$\Delta R_{bf} = 2 \text{ Re}[(n_2 + ik_2)r^* \partial r/\partial n] \times I_p E_o^2 (\omega/\omega_b)(\omega_e/\omega_{be}) \times \exp\{-\rho^2(1/\omega_b^2 + 1/\omega_{be}^2)\},$$

where $\omega_{be} = \Delta f/\pi\omega_e$. Defining $G_o \equiv \omega^2 \exp\{-\rho^2(\pi\omega)^2/(\lambda f)^2\}$, and $G_e \equiv \omega_e^2 \exp\{-\rho^2(\pi\omega_e)^2/(\lambda f)^2\}$, and evaluating $2\text{Re}[(n_2 + ik_2)r^* \partial r/\partial n]$ with $n^2 \gg k^2$ (where k is the extinction coefficient of the sample), then results in:

$$\Delta R_{bf} = (E_o \pi/\lambda f)^2 \times G_o \times 4n_2 I_p (n+1)/(n-1)^3 \times G_e. \quad (4)$$

Figure 3:
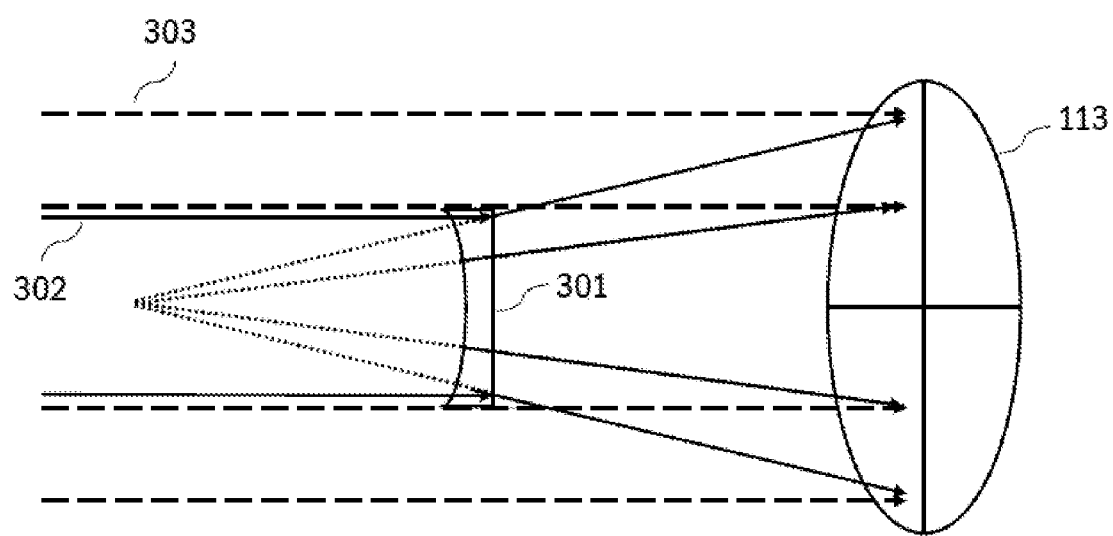
FIG. 3 illustrates an exemplary placement of a concave lens in the reflected probe beam path in a photoreflectance microscopy apparatus which may be used for imaging a photoreflectance signal at or near a back focal plane, in accordance with certain embodiments of the invention.

Eq. (4) represents the voltage contrast image of a semiconductor substrate at the back focal plane of a photoreflectance microscope. Several characteristics of photoreflectance microscopy may be understood from Eq. (4). For example, in an exemplary embodiment the probe beam waist $\omega$ may be roughly commensurate with the radius of modulation $\omega_m$, such that $\omega_e \approx \omega/\sqrt{3}$. In such case, along the collimated portions of the reflected probe beam path, a significant portion of the AC component of the beam will be outside the DC beam. However, since the photoreflectance signal corresponds to the interference of the AC and DC components, for back focal plane imaging, the portion of the AC beam outside the DC beam will be lost. This does not present an issue when imaging the object plane since the AC component will be refocused inside the DC beam. However, for imaging a photoreflectance signal at or near a back focal plane it is therefore advantageous to physically expand the DC beam (or focus the AC component) to achieve optimal overlap. As shown in FIG. 3, this may be accomplished with a concave lens 301 centered in the DC beam 302 such that the AC component 303 outside the DC beam 302 propagates unimpeded to the imaging plane. As may be further appreciated, the spatial separation of the AC and DC components in the collimated portions of the reflected probe beam allows the introduction of a phase shift between the AC and DC components using a wave plate fixtured in the DC beam.

As may be appreciated, the optical signature of an electronic defect will be superimposed on the "background" photoreflectance image (see, e.g., Eq. (4)). To understand the nature of such a signature it is necessary to consider the effect of an electrically active defect on the electric field of the reflected probe laser beam $E_r$ at the surface of the sample (i.e., in the object plane). On physical grounds, an electrically active point defect can be expected to reduce or quench the applied photo-voltage within an electrically active radius centered on the defect. Such an effect may be modeled by subtracting a term proportional to $(n_2+ik_2)$ from $E_r$:

$$E_r \to E_r - \eta E_o \exp\{-\rho^2/\omega^2\} \times \partial r/\partial n(n_2+ik_2) I_p \exp\{-[x-x_o)^2+(y-x_o)^2+(y-y_o)^2]/\omega_d^2\},$$

where $x_o$ and $y_o$ refer to the position of the defect in the object field ($\rho^2 \equiv x^2+y^2$), $\omega_d$ is the "active" electronic radius of the defect, and $\eta$ is a proportionality factor. Since the defect is generally not on the optical axis, it is convenient to propagate the defect term using the Huygens-Fresnel principle. The scalar field at the back focal plane of any lens is directly related to the Fourier transform of the object before the lens. Treating the electronic defect as an amplitude mask in the object plane, it may be shown the defect produces a phase shift at the back focal plane $\Delta p = k_x x_o + k_y y_o$, where $k_x = 2\pi x/\lambda f$ and $k_y = 2\pi y/\lambda f$, such that upon repeating the steps leading to Eq. (4) we find:

$$\Delta R_{bf} = (E_o \pi/\lambda f)^2 G_o \times 4 I_p(n+1)/(n-1)^3 [n_2 G_e - \eta(n_2 \cos\{\Delta\varphi\} + k_2 \sin\{\Delta\varphi\}) G_d], \quad (5)$$

where $G_d \equiv \omega_d^2 \exp\{-\rho^2(\pi\omega_d)^2/(\lambda f)^2\}$. The term proportional to $G_d$ in Eq. (5) represents the defect contribution to the voltage contrast image at the back focal plane of a photoreflectance microscope. Several characteristics of photoreflectance defect microscopy may be understood from Eq. (5). First, the appearance of the phase shift demonstrates the position of defects in the object plane $(x_o, y_o)$ are mapped to momentum space $(k_x, k_y)$ at the back focal plane. Thus the photoreflectance image at the back focal plane contains the directions of scattering from the electronic defect. Second, the phase shift demonstrates an off-axis electronic defect mixes an electro-absorptive $(k_2)$ contribution into the otherwise electro-refractive $(n_2)$ photoreflectance background. Third, from the form of $G_d$, in the case wherein the "imaging" waist $\omega_{ac}$ (defined by $1/\omega_{ac}^2 \equiv 1/\omega^2 + 1/\omega_m^2$) is substantially larger than the active radius $\omega_d$, scattering from the defect produces a delocalized contribution to the AC component of the beam along the collimated portions of the reflected probe beam path. This spatial separation of the "defect" and "background" components in the collimated portions of the reflected probe beam allows the introduction of a phase shift between the defect and background components using a wave plate fixtured in the background component such that the defect (electro-absorptive) contrast may maximized.

Moreover, the photoreflectance signal at a back focal plane including the optical signature of an electrically active defect, as expressed in Eq. (5), motivates a method for active defect inspection. First, when the "imaging" waist $\omega_{ac}$ is substantially larger than the active radius $\omega_d$, the delocalized defect contribution to the AC beam appearing along the collimated portions of the reflected probe beam may be conveniently detected using a ring or quad detector in combination with a multichannel lock-in amplifier. Second, an off-axis defect at the sample surface (object plane) will produce an asymmetric contribution to the photoreflectance signal at a back focal plane according to equation Eq. (5). Thus, a simple quad cell photodiode, located at or near a back focal plane, and configured to measure a differential intensity across opposing quadrants, can be used to quickly quantify the level of electrically active defects image within the object field (i.e., by picking up an asymmetric defect signature). Various embodiments of this basic idea may be realized by modifying the shape of the position sensitive detector, changing the number of lock-in detection channels, and/or varying the object plane field of view, all of which are known in the art. Thus a method of voltage contrast inspection of electrically active defects using photoreflectance microscopy is achieved.

In another exemplary scenario, the sample comprises a periodic semiconductor structure. In such case, the structure can be treated, to first order, as a cosine amplitude mask in the object plane. The components of the reflected probe beam in a photoreflectance microscope can then be derived using the Huygens-Fresnel principle. For example, at a back focal plane the electric field distribution of either probe beam component (AC or DC) takes the form:

$$E_{bf} = E_o(\omega/\omega_b) \exp\{-y^2/\omega_b^2\} \times [\tfrac{1}{4}\exp\{-x-\lambda f/d)^2/\omega_b^2\} + \tfrac{1}{2}\exp\{x^2/\omega_b^2\} \tfrac{1}{4}\exp\{-(x+\lambda f/d)^2/\omega_b^2\}],$$

where $d$ is the period of the semiconductor structure. Higher order terms in the description of the periodic structure produce additional diffraction orders. The photoreflectance signal at the back focal plane may then be obtained by forming the product $2\text{Re}[E \times \Delta E]$ as taught, for example, at paragraph [0022]. As may be appreciated, the directional dependence of the diffracted orders present in photoreflectance microscopy (and their relative amplitudes) provides direct sensitivity to the electronic properties of periodic semiconductor structures.

Thus in view of the above discussion, it is clear the systems and methods disclosed herein enable direct, high-throughput imaging of the active electronic properties of semiconductors, including semiconductor surfaces, periodic structures, and electrically active defects. However, it is also to be understood, the embodied techniques of the present disclosure may be implemented using a wide variety of optical configurations, including various suitable beam profiles, focal geometries, and/or optical elements. As such, all modifications to the exemplary optical configuration and/or its attendant manner of operation which retain the fundamental photoreflectance imaging capability taught and suggested herein are therefore properly understood as falling within the scope of the embodiments.

The disclosures of all patents, patent applications, and publications cited herein are hereby incorporated herein by reference in their entirety, to the extent that they provide exemplary, procedural, or other details supplementary to those set forth herein.

What is claimed is:

1. An apparatus for acquiring spatially resolved photoreflectance data, comprising:
   (a) a first laser source operable to provide an amplitude modulated pump laser beam suitable for inducing time periodic changes in the reflectance of a sample;
   (b) a second laser source operable to provide a continuous wave probe laser beam suitable for detecting pump induced changes in the reflectivity of the sample;

(c) an optical system operable to focus the pump laser beam and the probe laser beam onto a surface of the sample, and to collect and project probe light reflected from the sample to a back focal plane;

(d) a position sensitive detector, comprising a plurality of spatially arranged photosensor elements, fixtured at the back focal plane and operable to generate a plurality of electrical signals proportional to an input probe light intensity;

(e) a multichannel lock-in amplifier operable to output a plurality of demodulated signals corresponding to the plurality of electrical signals; and (f) a computer operable to receive and record the plurality of demodulated output signals, said plurality comprising spatially resolved photoreflectance data.

2. The apparatus of claim 1, wherein the optical system comprises a wave plate operable to introduce a phase shift between modulated and continuous wave components of the reflected probe light.

3. The apparatus of claim 1, wherein the optical system comprises a wave plate operable to introduce a phase shift between spatially separated components of the reflected probe light.

4. The apparatus of claim 1, wherein the optical system comprises a concave lens operable to overlap modulated and continuous wave components of the reflected probe light at the back focal plane.

5. The apparatus of claim 1, wherein the position sensitive detector comprises an avalanche photodiode array.

6. The apparatus of claim 1, wherein the multichannel lock-in amplifier comprises a field programmable gate array.

7. A method of acquiring spatially resolved photoreflectance data, the method comprising the steps of:

(a) directing an intensity modulated pump laser beam onto a surface of a sample to produce a time periodic modulation of the reflectance of the sample;

(b) focusing a second probe laser beam onto at least a portion of the area obtaining the time periodic modulation of the reflectance, wherein the probe laser beam comprises at least one wavelength suitable for detecting the induced changes in the reflectivity of the sample;

(c) collecting probe light reflected from the sample and projecting it onto a position sensitive detector fixtured at a back focal plane to generate a plurality of electrical signals corresponding to changes in reflected probe light intensity as a function of position;

(d) demodulating the plurality of electrical signals using a plurality of demodulation circuits, said plurality of demodulated signals comprising spatially resolved photoreflectance data; and (e) recording the spatially resolved photoreflectance data.

8. The method of claim 7, further comprising:
overlapping modulated and continuous wave components of the reflected probe light at the back focal plane.

9. The method of claim 7, further comprising:
introducing a phase shift between modulated and continuous wave components of the reflected probe light.

10. The method of claim 7, further comprising:
introducing a phase shift between spatially separated components of the reflected probe light.

11. The method of claim 7, wherein the position sensitive detector comprises a balanced detection circuit.

12. The method of claim 7, wherein the position sensitive detector comprises an avalanche photodiode array.

13. The method of claim 7, wherein the position sensitive detector comprises a lock-in camera.

14. The method of claim 7, wherein the step of demodulating the plurality of electrical signals is performed by a multichannel lock-in amplifier.

* * * * *